J. G. SMITH.
BONDING RAIL JOINT.
APPLICATION FILED MAR. 2, 1911.
1,033,767.
Patented July 23, 1912.
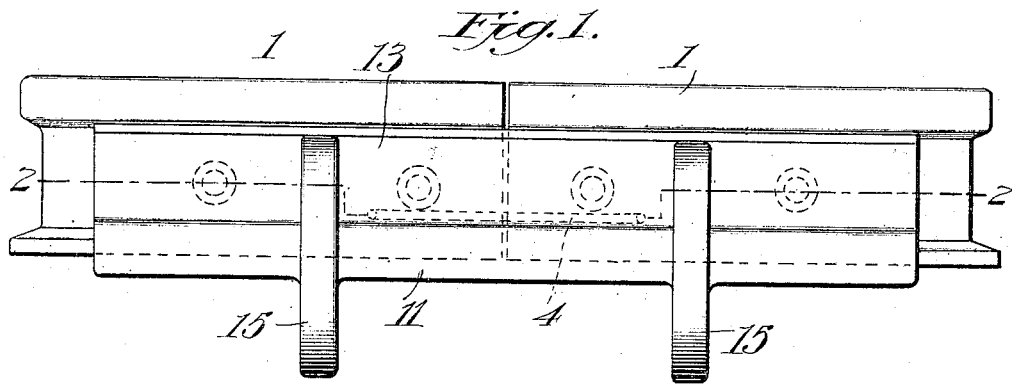
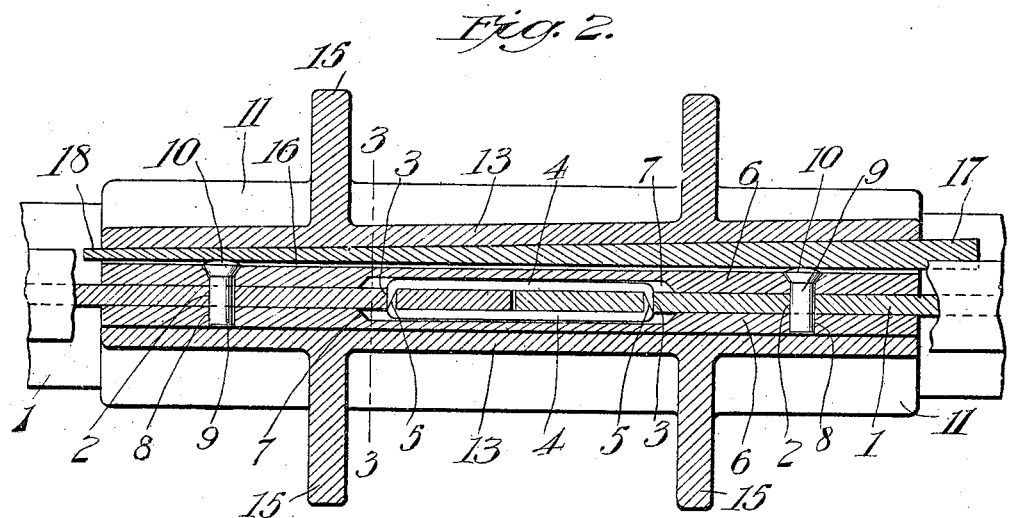
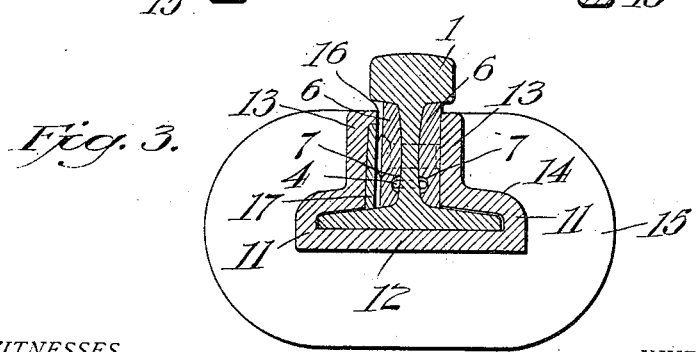
WITNESSES
INVENTOR
John G. Smith
By Julian C. Dowell
His Attorney

UNITED STATES PATENT OFFICE.

JOHN G. SMITH, OF DULUTH, MINNESOTA, ASSIGNOR TO FREDERICK E. HARDER, OF DETROIT, MICHIGAN.

BONDING RAIL-JOINT.

1,033,767.  Specification of Letters Patent.  Patented July 23, 1912.

Application filed March 2, 1911. Serial No. 611,926.

*To all whom it may concern:*

Be it known that I, JOHN G. SMITH, a citizen of the United States, residing at Duluth, in the county of St. Louis and State of Minnesota, have invented certain new and useful Improvements in Bonding Rail-Joints, of which the following is a specification.

This invention relates to rail-joints for electric railways, and the object of the invention is to provide a joint in which the meeting ends of the rails will be firmly held in place, and in which the bonding wire will be inclosed and protected so that injury to the same and consequent breaking of the electric circuit cannot occur.

The invention also has for its object the provision of a rail-joint in which the parts may be easily assembled, but will be secure against accidental separation while in use.

The objects of the invention are attained in such a device as is illustrated in the accompanying drawings, and the invention consists in certain novel features which will be hereinafter first fully described and then pointed out in the appended claims.

In the drawings, Figure 1 is a side elevation of a rail-joint embodying my improvements; Fig. 2 is a view partly in plan and partly in horizontal section on the line 2—2 of Fig. 1; Fig. 3 is a transverse section taken on the line 3—3 of Fig. 2.

The rails 1 are of the usual form and may be of any desired size. Through the webs of the rails are formed the usual openings for the reception of the securing bolts as indicated at 2. Through the webs near the bases of the rails I also form transverse openings 3 in which the ends of the bonding wire 4 are fitted, the bonding wire being in the form of bails, having their ends beveled, as shown at 5, so that when the ends are inserted in the opening 3 they will overlap and bind the wires within the openings so as to form intimate contact with the body of the rail, and thereby establish perfect electrical connection. As shown most clearly in Fig. 2, two bails are employed which are inserted into the openings 3 from opposite sides of the rails and the ends of the bails are oppositely beveled, so that the beveled portions will overlap and serve as wedges to bind the bails within the openings.

Against the webs of the rails I place fish plates 6 which are provided at their centers with horizontal longitudinal grooves or recesses 7 forming seats for the bonding wires, and completely inclosing the same, so that the said wires will be protected against any chance blows or accidental dislocation. The fish plates are provided with openings, indicated at 8, adapted to register with the openings 2 in the rails, and through these registering openings I insert pins or threadless bolts 9, as clearly shown. The pins are provided with heads 10 having a tapered formation, so that when they are driven home through the fish plates they will engage similar co-acting surfaces on the adjacent fish plate and thereby serve to bind the fish plate against the rails.

A joint chair 11 is provided which is in the form of a solid body having a base 12 adapted to extend under the bases of the rails and form a seat for the same, and side arms 13 adapted to lie parallel with the fish plates and webs of the rails, the portions 14, connecting the seat and side arms, being shaped to fit over the base flanges of the rails, as shown clearly in Fig. 3. In order to reinforce the chair, I provide lateral ribs 15 which continue under the seat or base 12 and constitute anchors which may be embedded in the road bed so as to prevent longitudinal movement of the chair after it has been fitted in place at the joint. The arm 13 at one side of the chair lies snugly against the adjacent fish plate while the arm 13 at the other side of the chair is spaced from the fish plate and extends at an angle thereto, as shown most clearly in Fig. 2, this side arm being also provided with an overhanging lip or flange 16 on its upper edge, as shown most clearly in Fig. 3. Between this side arm of the chair and the adjacent fish plate, a wedge-shaped locking key 17 is inserted, so as to bear against the arm and the heads of the pins 9, whereby, as the locking key is driven home, the pins will be forced through the fish plates and the rails to the limit of their movement, and the fish plates and the chair will be firmly bound together and against the rails, thus securely fastening the several parts in their assembled positions. The overhanging lip 16 will prevent the locking key rising from its seat and the key is preferably of such a length that its smaller end 18 may protrude beyond the end of the chair, and be bent against the outer face of the same, as shown in Fig. 2, to prevent the key working out from between the chair and the adjacent fish plate under the jarring caused by passing trains.

In assembling the parts of a joint in accordance with my invention, the chair is first slipped over the end of one rail and moved some distance along the same to permit the other parts to be brought into proper position. The bails constituting the bonding wires are then fitted in place and the fish plates placed against the webs of the rails so as to inclose the wires, as shown, and before described. The transverse pins 9 are then inserted through the fish plates and the rails, and the chair is then moved back so as to bridge the joint, after which the locking key will be driven home, as will be readly understood.

From the foregoing description taken in connection with the accompanying drawings, it will be seen that I have provided a rail-joint composed of few parts which may be readily assembled and disassembled when necessary, and by which the separation of the rails will be effectually prevented while the several parts are in place. The bonding wires establish perfect electrical connection between the ends of the rails and as there are no nuts or threaded parts employed, the accidental separation of the several elements of the joint is effectually prevented.

Having thus described my invention, what I claim as new and desire to secure by Letters Patent is:

1. The combination with meeting rails, of fish plates fitted against the opposite sides of the webs of the rails and provided in their inner sides near their lower edges with seats for bonding wires, headed pins inserted transversely through the fish plates and the rails, a chair inclosing the bases of the rails and having upstanding side arms, one of which arms bears against one of the fish plates and the other of which arms is provided with an inwardly projecting flange at its upper edge, and a wedge inserted longitudinally under said flange extending between the same and the bases of the rails and bearing upon the heads of the pins and the adjacent arm of the chair.

2. The combination with meeting rails, of fish plates fitted against the opposite sides of the webs of the rails and provided on their inner sides with seats for bonding wires, pins inserted transversely through the fish plates and the rails, a chair inclosing the bases of the rails and having upstanding side arms, one of said arms bearing against one of the fish plates and the other being provided with an inwardly projecting flange at its upper edge, and a wedge inserted between said arm and the adjacent fish plate and extending between said flange and the bases of the rails the length of the wedge being greater than the length of the chair.

3. In combination with meeting rails, fish plates fitted against the opposite sides of the webs of the rails and provided on their inner sides with elongated recesses to receive bonding wires, pins inserted transversely through the fish plates and the rails, a chair having upstanding side arms, one bearing against one of the fish plates and the other provided with an inwardly projecting flange at its upper edge, and a wedge inserted between said arm and the adjacent fish plate and between said flange and the bases of the rails.

In testimony whereof I affix my signature, in presence of two witnesses.

JOHN G. SMITH.

Witnesses:
JAMES L. JOHNSON,
HENRY HANSON.